US010433634B2

United States Patent
MacDonald (10) Patent No.: US 10,433,634 B2
(45) Date of Patent: Oct. 8, 2019

(54) MOUNT FOR WEARABLE DEVICES

(71) Applicant: GoNoGo Innovations Inc., Victoria (CA)

(72) Inventor: Jeffrey Josh MacDonald, Victoria (CA)

(73) Assignee: GoNoGo Innovations Inc., British Columbia (CA)

( * ) Notice: Subject to any disclaimer, the term of this patent is extended or adjusted under 35 U.S.C. 154(b) by 92 days.

(21) Appl. No.: 15/737,648

(22) PCT Filed: Jan. 6, 2017

(86) PCT No.: PCT/CA2017/050016
§ 371 (c)(1),
(2) Date: Dec. 18, 2017

(87) PCT Pub. No.: WO2017/117681
PCT Pub. Date: Jul. 13, 2017

(65) Prior Publication Data
US 2018/0177285 A1    Jun. 28, 2018

Related U.S. Application Data

(60) Provisional application No. 62/275,318, filed on Jan. 6, 2016, provisional application No. 62/414,284, filed on Oct. 28, 2016.

(51) Int. Cl.
*A45F 5/02*     (2006.01)
*F16M 13/04*   (2006.01)
(Continued)

(52) U.S. Cl.
CPC ............... *A45F 5/02* (2013.01); *A44B 99/00* (2013.01); *F16M 11/041* (2013.01);
(Continued)

(58) Field of Classification Search
CPC . Y10T 24/32; Y10T 24/13; A45F 5/02; F21V 21/0965; F21V 21/096;
(Continued)

(56) References Cited

U.S. PATENT DOCUMENTS 8,936,222 B1   1/2015  Bastian et al.
2005/0144760 A1*  7/2005  Verbaas ................... A45F 5/02
                                                            24/3.1
(Continued)

OTHER PUBLICATIONS

Canadian Intellectual Property Office, "International Search Report", dated Mar. 8, 2017, 2 pages, Gatineau, Quebec.

*Primary Examiner* — Jack W Lavinder
(74) *Attorney, Agent, or Firm* — Tomlinson McKinstry, P.C.

(57) ABSTRACT

A mount assembly for a wearable device including a flexible disc containing a rare-earth magnet for positioning on the outside of the user's clothing, a flexible disc containing a ferromagnetic material (either magnetized or non-magnetized) for positioning on the inside of the user's clothing in magnetic engagement with the first disc, and (attached to, or configured to be affixed to, a wearable device) a curved connector made of a non-magnetized ferromagnetic material for magnetic engagement with the first disc at a desired angle and rotation so as to provide user-selected directional control and ready mounting and demounting of the wearable device.

17 Claims, 5 Drawing Sheets

(51) Int. Cl.
    *F21V 33/00*     (2006.01)
    *F16M 11/04*     (2006.01)
    *F16M 11/10*     (2006.01)
    *F21V 21/096*     (2006.01)
    *H01F 7/02*     (2006.01)
    *A44B 99/00*     (2010.01)
    *H01F 1/053*     (2006.01)

(52) U.S. Cl.
    CPC ............ *F16M 11/10* (2013.01); *F16M 13/04* (2013.01); *F21V 21/0965* (2013.01); *F21V 33/0008* (2013.01); *H01F 7/02* (2013.01); *H01F 7/0221* (2013.01); *H01F 7/0252* (2013.01); *A44D 2203/00* (2013.01); *A45F 2200/05* (2013.01); *A45F 2200/0533* (2013.01); *H01F 1/053* (2013.01)

(58) Field of Classification Search
    CPC . F21V 33/0008; A44D 2203/00; A44B 99/00; B60R 2011/0057; B60R 2011/007; F16B 2001/0035; F16M 11/041; H01F 7/02; H01F 7/0221; H01F 7/0252; H01F 1/053
    USPC .............................................. 248/683, 206.5
    See application file for complete search history.

(56) References Cited

U.S. PATENT DOCUMENTS

| | | |
|---|---|---|
| 2013/0078855 A1 | 3/2013 | Hornick et al. |
| 2014/0159840 A1 | 6/2014 | Qadri |
| 2016/0286944 A1 | 10/2016 | Snyder |

\* cited by examiner

MOUNT FOR WEARABLE DEVICES

CROSS REFERENCE TO RELATED APPLICATIONS

This application claims the benefit of U.S. Provisional Patent Application No. 62/275,318, filed 6 Jan. 2016 and U.S. Provisional Application No. 62/414,284, filed 28 Oct. 2016.

FIELD OF THE INVENTION

The present invention relates to the field of mounts, particularly magnetic mounts for wearable devices for which directional control and/or ready demounting for hand use and ready remounting, are desirable.

BACKGROUND OF THE INVENTION

It has long been known to use magnets to temporarily affix lights to ferromagnetic surfaces, for example, as described in U.S. Pat. No. 4,470,106, Shop light, 4 Sep. 1984.

Magnets, typically rare-earth magnets, are also used in a variety of mounts (e.g., for cameras) to provide a desirably secure attachment between mount components while permitting relative movement/reorientation of the components. Some such mounts include components with corresponding concave and convex spherical features magnetically held in mating engagement, fore example: EP 1,433,996, Electric light for Work, 30 Jun. 2004; U.S. Pat. No. 7,909,521, Direction adjustable camera with magnetic mounting, 22 Mar. 2011; US 2004/0118985, Magnetic mounting assembly, 24 Jun. 2004; US 2005/0247845, Support for computer peripheral device, 10 Nov. 2005; and US 2009/0196597, Mounting and Positioning System, 6 Aug. 2009.

Magnets are also used to temporarily affix devices (e.g., lights) to clothing, for example, as described in US 2014/0285355, Multi-directional, multi-functional, wearable safety lighting apparatus, 25 Sep. 2014. Commercially available personal lights, temporarily affixable to clothing with magnets, include: the Guardian Angel™ Light Bar-Magnet Mount (425, Inc., Wisconsin); the Zyntony Ra™ (Zyntony, Inc., Utah); the Energizer™LED Magnet Light (Energizer Brands, LLC); and the Lucina™ Magnetic wearable light (Palomar S.r.l., Italy).

The SP Gadgets™ Flex Mount (SP United Vertriebs GmbH) is intended for temporarily securely affixing a camera to a sail (e.g., a conventional sail, a parasail, etc.), tarp etc. The SP Gadgets™ Flex Mount includes two "textile discs" each having four "very strong magnets". Applicant understands that the magnets in the two textile discs are in similar spaced apart arrangements such that in use on a sail, for example, a textile disc is positioned on each side of the sail, and each magnet is magnetically fixed to a corresponding magnet in the other textile disc. The portions of the textile discs between the magnets are sufficiently flexible to accommodate changes to the sail shape caused by changing use conditions (e.g., wind strength).

SUMMARY OF THE INVENTION

In this specification, including the claims, "pull force" means the maximum tensile force required to disconnect a single magnet from a thick, machined-flat steel plate, with the tensile force perpendicular to the steel plate. Typically, the pull force value is an average of five tests, and a digital force gauge is used to measure and record the tensile force.

The inventor has found that when using magnets for the purpose of affixing to clothing the variety of devices that users wish to affix to their clothing, including heavy jackets and the like (which devices often weigh in the range of about 1.4 oz or 40 grams to about 2.8 oz or 80 grams), in order to satisfactorily affix such devices (i.e., such that they are not dislodged during anticipated use, movement and contact with other objects), it is desirable to use rare-earth magnets with a minimum pull force of about 10 lbs and preferably with a pull force of about 15 lbs. However, rare-earth magnets with a pull force of about 10 lbs or greater are difficult for a user to manipulate (particularly to manually separate such magnets when they are in magnetic engagement). As well, rare-earth magnets with a pull force of about 10 lbs or greater may be dangerous. For example, the magnetic attraction between such rare-earth magnets and the associated velocity with which the magnets are drawn to each other, may result in pinched skin and/or cut or torn skin.

In one aspect, the present invention provides a mounting assembly for a device, primarily for mounting wearable devices to clothing (or other flexible materials) but also for use as a general stand or mount for such devices. Embodiments of the mount assembly may reduce the potential for harm and/or injury at times associated with handling of rare-earth magnets (e.g., finger pinching, harm to the magnets etc.).

Embodiments of the mounting assembly of the present invention include a disc mount including a disc body supporting a rare-earth disc magnet (preferably a cylindrical rare-earth magnet), having a center of magnetic effect (e.g., in the case of a cylindrical rare-earth magnet, a point on the cylindrical axis).

The disc body is preferably resiliently flexible (i.e., elastically deformable). The disc body preferably has a circular outer periphery, but the outer periphery may be another shape (e.g., geometric or irregular). The distance from the center of magnetic effect to the portion of the outer periphery of the disc body that is furthest from the center of magnetic effect, is preferably in the range of about 1 inch to about 3 inches. Thus, in the case of a disc body with a circular outer periphery, the radius of the disc body is preferably in the range of about 1 inch to about 3 inches.

The disc body is configured such that at least a portion of the outer periphery of the disc body may be manually flexed away from a ferromagnetic material with which the disc magnet is in magnetic engagement, so as to separate the disc mount from the ferromagnetic material, essentially by levering the disc magnet away from the ferromagnetic material, wherein the disc body functions as a resiliently flexible lever.

Preferably, the disc body consists of a substantially homogenous resiliently flexible material, for example, a thermoplastic elastomer, a rubber or a silicone.

Preferably, the cylindrical rare-earth magnet is encapsulated within the disc body, such that a substantially uniform thickness of disc body material overlies each pole of the rare-earth magnet. The force of magnetic attraction declines rapidly with distance. Preferably, the thickness of the disc body material is such that the pull force of the disc mount (i.e., with the disc body material interposed between the rare-earth magnet and the steel plate used in pull force test) is in the range of about ½ to about ¾ (more preferably, about ⅔) of the pull force of the rare-earth magnet. It is understood that in embodiments of the present invention with a rare-earth magnet having a pull force of about 10 pounds the disc mount pull force is about 7 pounds and with a rare-earth magnet having a pull force of about 15.3 pounds the disc mount pull force is about 10.3 pounds. In terms of the intended functionality of the embodiments of the present invention (e.g., affixing devices to clothing and other fabric, and providing a base for devices), the inventor understands that the qualities of the material overlying the magnet (including friction and relatively low shore hardness) more than make up for the decline in magnetic attraction between the components.

Embodiments of the mounting assembly of the present invention include a connector, being ferromagnetic material integral to a device (in which case the connector may be exposed or encapsulated within the device) or affixed to a device or configured for attachment to a device.

Preferably the connector is a curved connector, being a ferromagnetic material shaped so as to substantially define a ruled surface (i.e., in geometry, a ruled surface is a surface in which for every point on the surface there is a notional straight line that lies on the surface) in which: the notional straight lines are all parallel to each other and the surface has a curve. The curved connector is in use associated with a device. The curved connector may be integral to a device (in which case the curved connector may be exposed or encapsulated within the device) or affixed to a device or configured for attachment to a device.

A device associated with a curved connector may be temporarily fixed in a desired orientation relative to the disc mount by bringing the curved connector into sufficient proximity to the disc mount to bring the ferromagnetic material into magnetic engagement with the disc magnet and, if desired, further "aiming" the device by moving the location of magnetic engagement along the curve and/or rotating the curved connector relative to the disc mount about the location of magnetic engagement. The curved connector-disc mount magnetic interaction thus provides both: ready mounting and demounting; and directional control.

Alternative embodiments of the mounting assembly of the present invention may include a ferromagnetic disc mount including a ferromagnetic disc body encapsulating a ferromagnetic material. The ferromagnetic material of the ferromagnetic disc mount may be non-magnetized or magnetized. If magnetized, the ferromagnetic material of the ferromagnetic disc mount is preferably a rare-earth magnet (more preferably, a cylindrical rare-earth magnet). The ferromagnetic disc body is preferably made from resiliently flexible material.

A disc mount may be releasably attached to a user's clothing at a desired location by bringing the disc mount and ferromagnetic disc mount into magnetic engagement with clothing material interposed therebetween.

The curve of the curved connector may have a constant radius whereby the ruled surface corresponds to a section of the cylinder wall of a right circular cylinder. Alternatively, the ruled surface may correspond to a section of the cylinder wall of another type of cylinder (e.g., an elliptical cylinder). As a further alternative, the curve may be an irregular curve selected by the designer to provide different strengths of magnetic engagement for different angular orientations. For example, with a device having a linear extent, it may be desirable to have the maximum strength of magnetic engagement at the angular orientation in which the device is projecting normal to the mount disc (as this is the angular orientation in which the device may have the greatest gravity-induced moment arm and in which the device is most likely to come into potentially dislodging contact with other objects. The curved connector may be a curved plate with a substantially uniform thickness. Alternatively the curved connector may be a curved plate having thicker bands along the curved edges. Alternatively, the curved connector may be two discrete spaced-apart curved bands.

In one aspect, the present invention provides a mount assembly for use in mounting a device to a users article of clothing having a first side and a second side, the assembly including: a non-magnetized ferromagnetic connector associated with the device, wherein the connector is integral to the device, or affixed to the device, or configured for attachment to the device; a ferromagnetic member; and a magnetic mount disc comprising a first magnet having a pull force of about 10 pounds or greater, and a center of magnetic effect; and a magnetic mount body housing the first magnet, wherein: the magnetic mount body has an outer periphery: a distance from the center of magnetic effect to a portion of the outer periphery that is furthest from the center of magnetic effect is in the range of about 1 inch to about 3 inches; and the magnetic mount body is resiliently flexible; wherein: the magnetic mount disc is releasably securable at a desired location on the first side by positioning the ferromagnetic member on the second side so as to bring the first magnet and the ferromagnetic member into magnetic engagement; the connector is releasably securable to the magnetic mount disc by bringing the connector into magnetic engagement with the first magnet; and the magnetic engagement between the first magnet and the ferromagnetic member may be broken by manual flexing of the outer periphery away from the ferromagnetic member.

The connector may be a curved connector substantially defining a ruled surface, being a surface in which for every notional point on the surface there is a notional straight line that lies on the surface, wherein in the ruled surface: the notional straight lines are all substantially parallel to each other; and the ruled surface comprises a curve.

The curved connector may be a plate of substantially uniform thickness, wherein the curve comprises a cylindrical section with a constant radius and two opposed arc ends. The curve may include a planar extension at one of the arc ends; or a first planar extension at one of the arc ends and a second planar extension at the other of the arc ends. The curve may have an arc in the range of about 90 degrees to about 140 degrees. The arc may be about 110 degrees. The curved connector may include two spaced-apart bands.

The first magnet may be a cylindrical rare-earth magnet with a magnet diameter; the curved connector may have a curved connector length, being a dimension measured parallel to the notional lines; and a ratio of the magnet diameter to the curved connector length may be in the range of 3:8 to 1:1. The ratio may be 5:8.

The first magnet may be a cylindrical rare-earth magnet encapsulated within the magnetic mount body; a substantially uniform thickness of the magnetic mount body may overlay each pole of the rare-earth magnet; and a pull force of the magnetic mount disc, being a pull force at the substantially uniform thickness of the magnetic mount body overlying one of the poles of the rare-earth magnet, may be about 7 pounds or greater.

The outer periphery may be circular. The magnetic mount body may include one or more of: a thermoplastic elastomer, a rubber; and a silicone.

The magnetic mount body may have a planar side; a disc edge about the outer periphery; and a truncated-cone side comprising: a central frustum substantially parallel to the planar side; and a conical annular section between the central frustum and the disc edge. The magnetic mount body may include one or more disc holes extending between the planar side and the truncated-cone side.

The first magnet may be a cylindrical rare-earth magnet with a diameter of about 0.625 inches and thickness of 0.25 inches; and the curved connector may be a curved plate with a thickness of about 0.0625 inches and substantially defining a section of a cylinder wall of a right circular cylinder having: a radius of about 0.5 inches; an arc of about 110 degrees; and a length, being the length of the plate measured parallel to a right circular cylinder axis, of about 1 inch.

The ferromagnetic member may be a second magnet having a pull force of about 10 pounds or greater, and a second center of magnetic effect; and the mount assembly may also include a ferromagnetic mount body housing the second magnet, wherein: the ferromagnetic mount body has a ferromagnetic mount body outer periphery; a distance from the second center of magnetic effect to a portion of the ferromagnetic mount body outer periphery that is furthest from the second center of magnetic effect is in the range of about 1 inch to about 3 inches; and the ferromagnetic mount body is resiliently flexible.

Each of the first magnet and second magnet may be a cylindrical rare-earth magnet.

One or both of the first magnet and second magnet may be: a cylindrical rare-earth magnet with an annular ridge; or a cylindrical rare-earth magnet with an annular groove; or two cylindrical rare-earth magnets and a ferromagnetic wafer, wherein the rare-earth magnets have a diameter, the wafer has a cross dimension greater than the diameter, and the wafer is interposed between, and in magnetic engagement with, the rare-earth magnets whereby a portion of the wafer projects from between the rare-earth magnets; or a ring rare-earth magnet; or a polygonal rare-earth magnet.

In another aspect, the present invention provides a mount assembly for mounting a device to a user's article of clothing having a first side and a second side, the assembly including: a non-magnetized ferromagnetic curved connector associated with a device, and substantially defining a ruled surface, being a surface in which for every notional point on the surface there is a notional straight line that lies on the surface, wherein in the ruled surface substantially defined by the curved connector: the notional straight lines are all substantially parallel to each other; and the surface comprises a curve; a magnetic mount disc comprising a first magnet and a magnetic mount body housing the first magnet; and a ferromagnetic member; wherein: the magnetic mount disc is releasably securable at a desired location on the first side by positioning the ferromagnetic member on the second side so as to bring the first magnet and ferromagnetic member into magnetic engagement; and the connector is releasably securable at a desired angle and a desired rotational position on the magnetic mount disc by bringing the connector into magnetic engagement with the first magnet at a desired location along the curve and a desired rotational orientation about the magnetic engagement.

The mount assembly may also include a ferromagnetic mount body housing the ferromagnetic member and the ferromagnetic member may be a second magnet. Each of the first magnet and second magnet may be a cylindrical rare-earth magnet.

One or both of the magnetic mount body and the ferromagnetic mount body, may include one or more of: a thermoplastic elastomer, a rubber; and a silicone.

One or both of the magnetic mount body and the ferromagnetic mount body, may have: a planar side; a disc edge about the periphery of the planar side; and a truncated-cone side having: a central frustum substantially parallel to the planar side; and a conical annular section between the central frustum and the disc edge. One or more disc holes may extend between the planar side and the truncated-cone side.

Each of the first magnet and second magnet may be a cylindrical rare-earth magnet with a diameter of about 0.625 inches and thickness of 0.25 inches; and the curved connector may be a curved plate with a thickness of about 0.0625 inches and may substantially define a section of a cylinder wall of a right circular cylinder having: a radius of about 0.5 inches; an arc of about 110 degrees; and a length, being the length of the plate measured parallel to the right circular cylinder axis, of about 1 inch.

DETAILED DESCRIPTION WITH REFERENCE TO THE DRAWINGS

Figure 1:
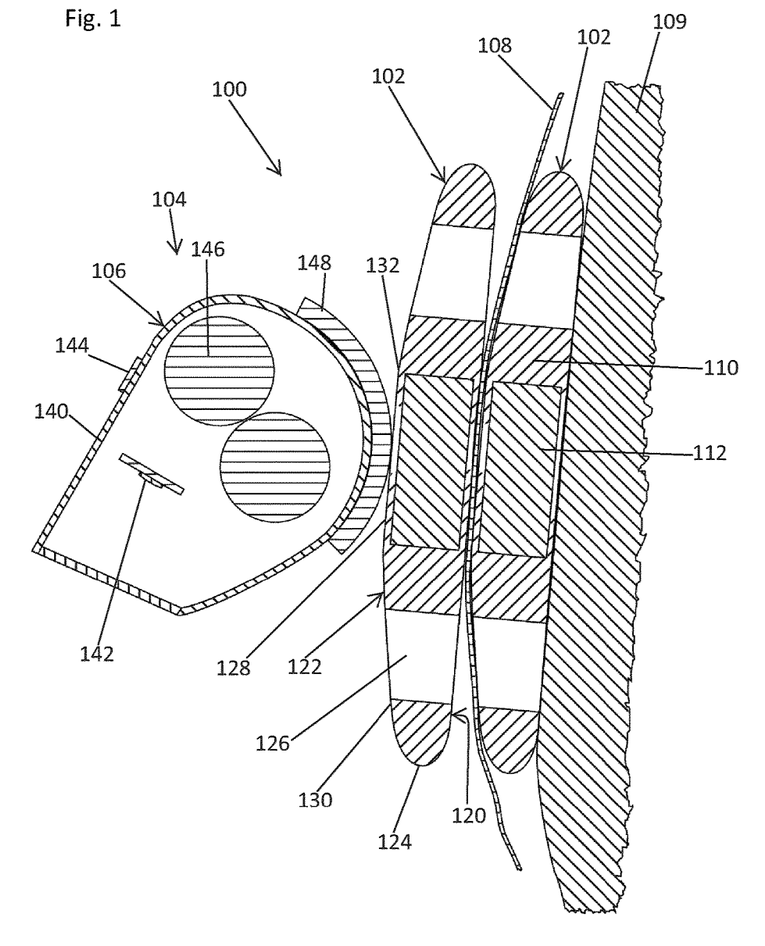
FIG. 1 is a sectional elevation view of a wearable curved-mount light assembly embodiment of the present invention, shown in use.

As shown in the drawings, embodiments of the present invention include a wearable curved-mount light assembly 100 comprising a two planar-conical magnetic mount discs 102 and a wearable unit 104, being a curved-mount light unit 106, for temporarily mounting to clothing material 108 overlying a user's body 109.

Figure 2:
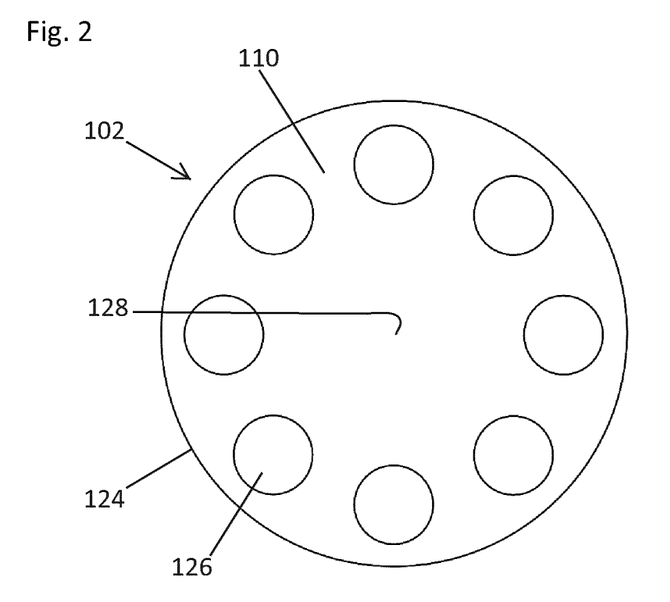
FIG. 2 is a top elevation view of a planar-conical magnetic mount disc of the embodiment shown in FIG. 1.

Each planar-conical magnetic mount disc 102 includes a planar-conical disc body 110 and a planar-conical disc magnet 112 enclosed within the planar-conical disc body 110.

The planar-conical disc body 110 includes a planar side 120, a truncated-cone side 122, a planar-conical disc edge 124 and an array of disc holes 126. The truncated-cone side includes a central frustum 128 (a "frustum" being the plane cutting off the apex of a cone to form a truncated cone) parallel with the planar side 120, and a conical annular section 130 extending in a slope between the central frustum shoulder 132 and the planar-conical disc edge 124. The planar-conical disc edge 124 is smooth and rounded, and in cross section approximates a so-called half-round (or half-bullnose) convex configuration.

The disc holes 126 extend between the planar side 120 and the truncated-cone side 122. Desirably, the disc holes 126 reduce the total mass of the planar-conical magnetic mount disc 102 and provide variations in the surface to assist a user when grasping the planar-conical magnetic mount disc 102.

The planar-conical disc body 110 is made from a material that is relatively flexible such that the portions of the planar-conical disc body 110 bounded by the planar side 120 and the truncated-cone side 122 may be readily manually bent by a person with average finger strength. Due to the tapering of the portion of the planar-conical disc body 110 bounded by the planar side 120 and the truncated-cone side 122, sections of the planar-conical disc body 110 adjacent the planar-conical disc edge 124 are more bendable than sections adjacent the central frustum shoulder 132. The bendability of the planar-conical disc bodies 110 makes it unlikely that a users fingers will be pinched between two planar-conical magnetic mount discs 102.

Each planar-conical disc magnet 112 is a cylindrical rare-earth magnet, axially magnetized (i.e., the magnetic poles are at the planar cylinder ends). Rare-earth magnets are strong permanent magnets made from alloys of rare earth elements. There are two types: neodymium magnets and samarium-cobalt magnets. The planar-conical disc magnet 112 (and other magnets referred to herein) are preferably neodymium magnets, as currently they are the strongest and most affordable type of rare-earth magnet. Rare-earth magnets are extremely brittle and also vulnerable to corrosion, so they are usually plated or coated to protect them from breaking, chipping, or crumbling into powder.

Each planar-conical disc magnet 112 is centered within the respective planar-conical magnetic mount disc 102 in that the planar-conical disc magnet 112 is equidistant from opposed locations about the planar-conical disc edge 124 and is equidistant from the planar side 120 and the central frustum 128. This encapsulation of the rare-earth magnets assists in protecting them from corrosion and physical harm (e.g., breaking, chipping etc.)

The polarity of the planar-conical disc magnets 112 is the same in both of the planar-conical magnetic mount discs 102. That is, if one of the planar-conical disc magnets 112 is oriented with its north pole adjacent the central frustrum 128 and its south pole adjacent the planar side 120, then the other of the planar-conical disc magnets 112 will also be so oriented. Alternatively, if one of the planar-conical disc magnets 112 is oriented with its south pole adjacent the central frustrum 128 and its north pole adjacent the planar side 120, then the other of the planar-conical disc magnets 112 will also be so oriented. Thus, the planar side 120 of one of the planar-conical magnetic mount discs 102 will be magnetically attracted to the truncated-cone side 122 of the other of the planar-conical magnetic mount discs 102.

When the planar-conical disc magnets 112 are in magnetic engagement with each other, they jointly produce a magnetic field that is stronger than each of their magnetic fields, It is known that two magnets held together by mutual magnetic attraction act similar to one magnet that is about equal in strength to the combination of the two magnets. The pulling force of magnetism is nearly doubled by placing two identical magnets together in this way. This feature of essentially additive magnetism (or "compounding magnetism") also occurs with three magnets combined in this manner, but thereafter adding more magnets does not appreciably add to strength of the combined magnetic fields.

Figure 3:
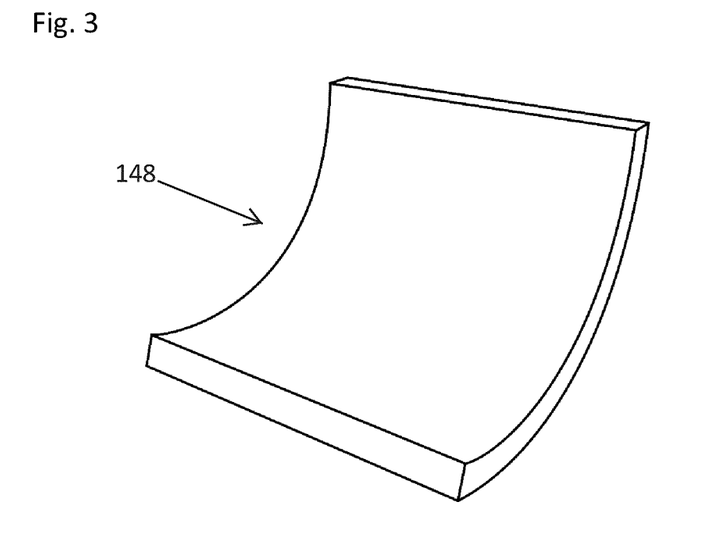
FIG. 3 is an isolation perspective schematic representation of an arcuate connector of the embodiment shown in FIG. 1.

The curved-mount light unit 106 includes a light-unit body 140, a light emitter 142 (preferably an LED), a light switch 144, a battery 146, and a ferromagnetic non-magnetized connector, being an arcuate connector 148.

A conventional low-carbon steel is a suitable material for the arcuate connector 148. In embodiments in which the arcuate connector 148 is low-carbon steel and is exposed, it is preferable to protect the arcuate connector 148 from corrosion, for example by application of a protective coating. In embodiments in which the arcuate connector 148 is encapsulated within the light-unit body 140, corrosion protection is presumably unnecessary.

The arcuate connector 148 is a curved plate with a thickness, being the thickness of the plate comprising the arcuate connector 148. The arcuate connector 148 can be visualized as comprising a section of the cylinder wall of a right circular cylinder, having a radius (being the radius of the convex side of the curved plate), a length (i.e., the length of the plate measured parallel to the axis of the cylinder), and an arc (quantified herein in degrees). Preferably, the ratio of the diameter of the planar-conical disc magnet 112 to the length of the arcuate connector 148 is about 5:8.

A user may mount the wearable curved-mount light assembly 100 by: affixing the planar-conical magnetic mount discs 102 to the clothing material 108 at a desired location, by placing one of the planar-conical magnetic mount discs 102 on one side of the clothing material 108 and placing the other of the planar-conical magnetic mount discs 102 on the other side of the clothing material 108 in sufficient proximity then bring the two planar-conical disc magnets 112 into disc-to-disc magnetic attraction engagement; and then bringing the arcuate connector 148 into disc-to-connector magnetic attraction engagement. The user may adjust the directional orientation of the curved-mount light unit 106 by "rolling" the curved-mount light unit 106 so as to move the location of disc-to-connector magnetic attraction engagement along the arcuate connector 148 and by rotating the curved-mount light unit 106 about the location of the disc-to-connector magnetic attraction engagement.

The planar-conical disc body 110 is preferably made from a material with a relatively high surface friction, as this assists in retaining the arcuate connector 148 in a desired position relative to the planar-conical magnetic mount disc 102. Further, the planar-conical disc bodies 110 are preferably made from a material with a hardness (i.e., resistance to indentation) that permits at least some indentation of the arcuate connector 148 into the planar-conical disc body 110 when the arcuate connector 148 and planar-conical magnetic mount disc 102 are in disc-to-connector magnetic attraction engagement, as this also assists in retaining the arcuate connector 148 in a desired position relative to the planar-conical magnetic mount disc 102 due to the associated increase in area of surface contact and shear resistance associated with the interaction between the edges of the indentation and the arcuate connector 148.

The user may demount the wearable curved-mount light assembly 100 by separating the planar-conical magnetic mount discs 102 so as to disengage the disc-to-disc magnetic attraction engagement. With the planar-conical magnetic mount discs 102 in disc-to-disc magnetic attraction engagement, the planar side 120 of one of the planar-conical magnetic mount discs 102 and the conical annular section 130 of the other of the planar-conical magnetic mount discs 102 define an circumferentially extending annular gap. The user may separate the planar-conical magnetic mount discs 102 by inserting something (e.g., a finger tip) into the gap so as to bend and spread apart the adjacent portions of the respective truncated-cone sides 122 and thence to pry apart the planar-conical magnetic mount discs 102.

Preferably, when mounted, the planar-conical magnetic mount discs 102 are oriented with their planar sides 120 closer to the user's body than their truncated-cone sides 122. Compared to the truncated-cone side 122, the planar side 120 of the innermost planar-conical magnetic mount disc 102 (i.e., the planar-conical magnetic mount disc 102 closest to the user's body) provides a wider "base" for abutting the user's body, or intervening clothing, for resisting the moment arm associated with the mass of the outermost planar-conical magnetic mount disc 102 and the curved-mount light unit 106. Also, the general configuration of the truncated-cone side 122 (i.e., the central frustum 128 and conical annular section 130) assist a user in bringing the curved-mount light unit 106 to the location of magnetic attraction engagement.

It is noted that a user could use only a single planar-conical magnetic mount disc 102 on the inside of the clothing material 108 to mount a wearable unit 104 in direct contact with the outside of the clothing material 108. However, such an arrangement is understood to be less desirable than using two planar-conical magnetic mount discs 102 as described above because: it would not provide the compounding magnetism obtained by using two planar-conical magnetic mount discs 102; adjusting the wearable unit 104 may diminish the strength of the disc-to-connector magnetic attraction engagement permitting the single planar-conical magnetic mount disc 102 to move (perhaps dropping a significant distance within the user's clothing); adjusting the wearable unit 104 may cause wear to the clothing material 108; and the clothing material 108 is unlikely to provide the security of positioning achievable through engagement between the arcuate connector 148 and planar-conical disc body 110 under the disc-to-connector magnetic attraction engagement.

In a prototype of the wearable curved-mount light assembly 100, the planar-conical disc body 110 has been made from a semi-rigid urethane casting resin (e.g., Smooth-On, Inc.'s TASK™ 13 & TASK™ 14, having a Shore Hardness (ASTM D-2240) of 50 D). However, it is understood that mass-produced versions of the planar-conical disc body 110 would likely comprise a thermoplastic elastomer, rubber, silicone or similar material, and would presumably be made by injection molding.

In the prototype of the wearable curved-mount light assembly 100:
the planar-conical magnetic mount disc 102 is configured as follows:
the planar-conical disc body 110 has a diameter of about 2.2 inches;
the central frustum 128 has a diameter of about 0.75 inches;
the planar-conical magnetic mount disc 102 has a maximum thickness (i.e., between the central frustum 128 and the planar side 120) of about 0.3 inches thick and a peripheral thickness (i.e., immediately adjacent the planar-conical disc edge 124) of about 0.14 inches;
the planar-conical disc magnet 112 is a neodymium magnet with a diameter of 0.625" and thickness of 0.25 inches;
the thickness of planar-conical disc body 110 material overlying the planar-conical disc magnet 112 at each of the planar side 120 and the central frustum 128 is about 0.025 inches; and
there are eight disc holes 126, each with a diameter of about 0.375 inches and each located with its center about 0.375 inches from the outer periphery of the planar-conical disc body 110; and
the arcuate connector 148 is made from cold-rolled AISI 1010 steel, configured as follows:
the radius is about 0.5 inches;
the length is about 1 inch;
the arc is about 110 degrees; and
the thickness is 0.0625 inches.

Increasing the radius of the arcuate connector 148 increases the ferromagnetic material proximate to the planar-conical disc magnet 112 and thus increases the strength of the disc-to-connector magnetic attraction engagement. However, this generally desirable increase in the strength of the disc-to-connector magnetic attraction engagement must be balanced with an associated increase in the size of the arcuate connector 148 which may be undesirable.

Increasing the degrees of arc of the arcuate connector 148 increases the range of available angles of the light-unit body 140 (or other directional device). However, as the wearable unit 104 may be rotated (including being rotated 180 degrees) as well as angled, an arc of about 110 degrees is understood to provide a desirable range of operational angles (e.g., at least about 180 degrees).

Figure 4:
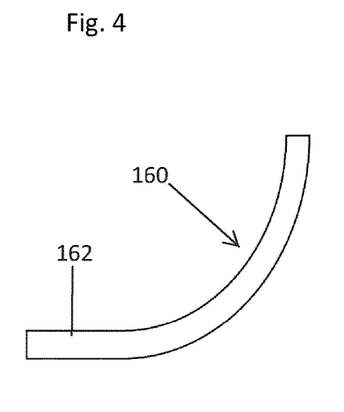
FIG. 4 is an isolation perspective schematic representation of a one-extension arcuate connector embodiment.
Figure 5:
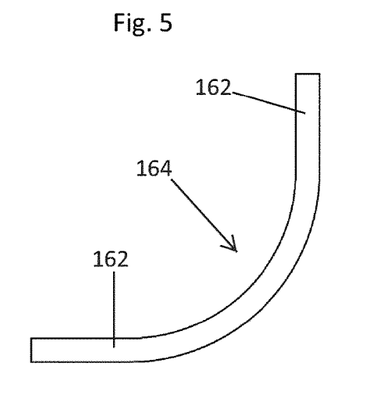
FIG. 5 is an isolation perspective schematic representation of a two-extensions arcuate connector embodiment.

Alternative ferromagnetic non-magnetized connectors include the one-extension arcuate connector 160 (which has a single planar extension 162) and the two-extensions arcuate connector 164 (which has two planar extensions 162). It is understood that the planar extensions 162 increase stability at the associated extreme angle of the directional device by providing an increased amount of ferromagnetic material proximate to the planar-conical disc magnet 112.

Alternative ferromagnetic non-magnetized connectors may include connectors without a constant curve. For example, with directional devices in which it is not possible or practical to locate the center of gravity of the directional device close to the ferromagnetic non-magnetized connector, it may be useful to flatten the portion of the curve of the ferromagnetic non-magnetized connector that contacts the planar-conical magnetic mount disc 102 when the directional device mass induced moment arm is greatest (i.e., presumably when the directional device is extending generally horizontally). Alternatively, the ferromagnetic non-magnetized connectors may have a plurality of planar or flattened sections defining discrete angle orientations for the directional device.

Preferably, the length of the ferromagnetic non-magnetized connector is greater than the diameter of the relevant disc magnet. The magnetic field of a disc magnet extends from an outer radius section of the magnet diminishing towards the center as well as extending outward beyond the outer limit of the magnetic material and then diminishing.

Figure 6:
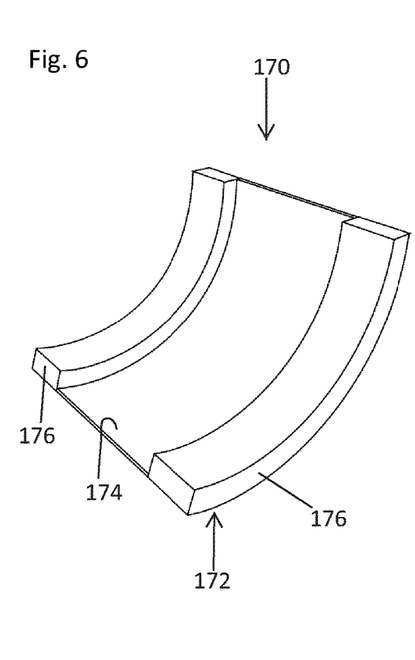
FIG. 6 is an isolation perspective schematic representation of a unitary dual-band connector embodiment.
Figure 7:
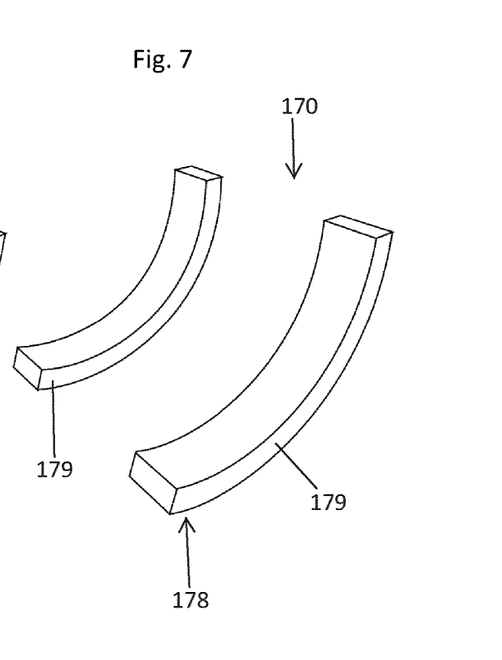
FIG. 7 is an isolation perspective schematic representation of a dual-discrete-band connector embodiment.
Figure 8:
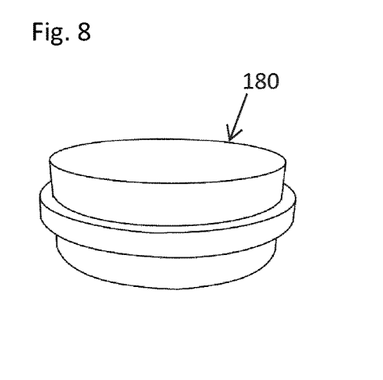
FIG. 8 is a perspective view of an annular-ridge magnet embodiment.
Figure 9:
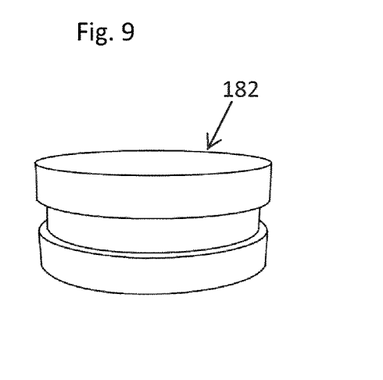
FIG. 9 is a perspective view of an annular-groove magnet embodiment.
Figure 10:
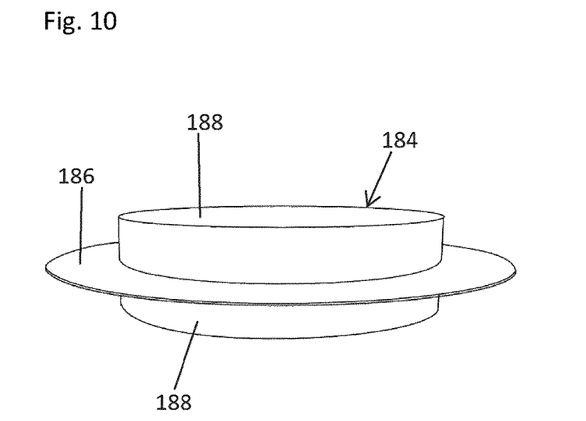
FIG. 10 is a perspective view of a magnet-wafer-magnet assembly embodiment.
Figure 11:
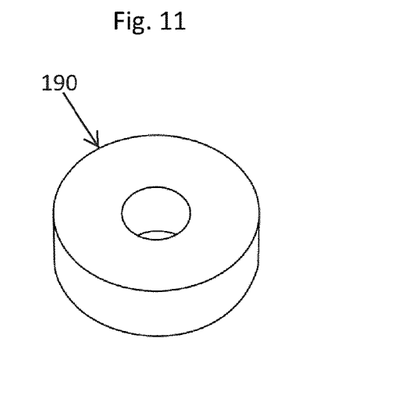
FIG. 11 is a perspective view of a ring magnet embodiment.
Figure 12:
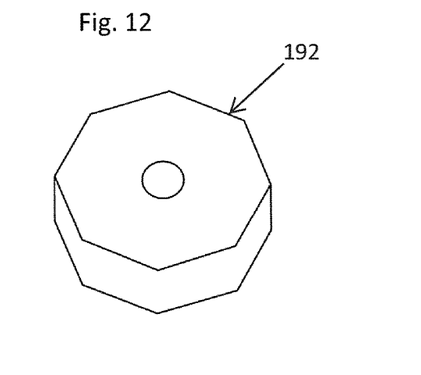
FIG. 12 is a perspective view of a polygon magnet embodiment.

The ferromagnetic non-magnetized connector may be a dual-band connector 170 comprising two spaced-apart relatively thick bands of ferromagnetic material, for example: a unitary dual-band connector 172, being a single component comprising a central span 174 and two thick edges 176; and a dual-discrete-band connector 178 comprising two discrete band members 179. As compared to a ferromagnetic non-magnetized connector configured as a plate of a uniform thickness, the dual-band connector 170 is understood to provide a stronger disc-to-connector magnetic attraction engagement for the same amount of ferromagnetic material, because the ferromagnetic material of the dual-band connector 170 is concentrated where the relevant magnetic field strength is greatest. Relatively weak magnetic force is associated with the center of a disc magnet in that the magnetic field of a disc magnet extends from an outer radius section of the magnet diminishing towards the center of the magnet and extending outward beyond the outer limit of the magnetic material and then diminishing.

As magnetic field strength diminishes rapidly with distance, it is desirable for the portions of the planar-conical disc body 110 overlying the poles of the planar-conical disc magnet 112 to be relatively thin. Thus, it may be desirable to configure the magnet and disc body to provide additional magnet support. Alternative magnet configurations include, an annular-ridge magnet 180, an annular-groove magnet 182, a magnet-wafer-magnet assembly 184 (in which a wafer 186 (i.e., a thin ferromagnetic plate) is interposed between two thin disc magnets 188 and the wafer 186 projects from between the two thin disc magnets 188); a ring magnet 190 (having a middle hole; the middle hole may assist in distributing material during injection molding); a polygon magnet 192 (which may also have a middle hole), etc.

Alternatives to the general shape of the planar-conical magnetic mount disc 102 may be used. For example the mount body need not be a disc in that the edge of the mount body need not be circular. Further the mount need not have a side generally configured as a truncated cone. Preferably, both sides of the mount should not be completely flat with no softening of the edge, as this could make it more difficult to separate the mounts and a sharp edge could cause discomfort in contact with a user's body.

In some applications, it may be desirable to use a third planar-conical magnetic mount disc 102.

Figure 13:
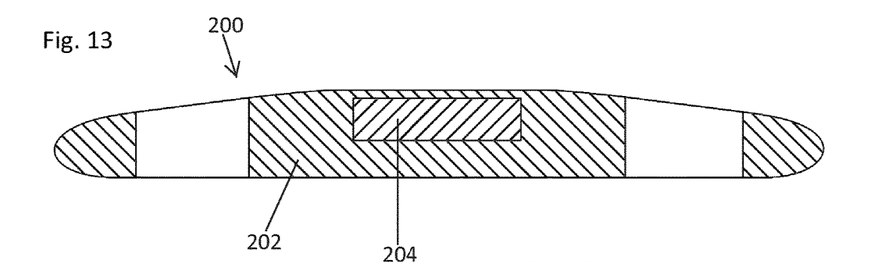
FIG. 13 is side elevation sectional view of a ferromagnetic disc mount embodiment.

A ferromagnetic disc mount 200 may be used in addition to the planar-conical magnetic mount discs 102 or instead of the planar-conical magnetic mount disc 102 that in use is located on the inside of the clothing material (i.e., closest to the user's body). The ferromagnetic disc mount 200 comprises a ferromagnetic disc body 202 and a ferromagnetic member 204 enclosed within the ferromagnetic disc body 202.

Preferably, the ferromagnetic disc body 202 is configured so as to be readily distinguishable from the planar-conical magnetic mount disc 102. Preferably, the ferromagnetic disc body 202 and the planar-conical magnetic mount disc 102 are readily distinguishable by feel without visual confirmation. Preferably, the diameter of the ferromagnetic disc body 202 is larger than the diameter of the planar-conical magnetic mount disc 102. Preferably, the ferromagnetic disc body 202 is made from a material comparable to the material of the planar-conical disc body 110 in terms of flexibility, surface friction and shore hardness. Preferably, the surface of the ferromagnetic disc body 202 intended to be closest to the user's body is planar.

The ferromagnetic member 204 is a circular plate of ferromagnetic material with a diameter preferably in the range of 1.2 to 1.5 times the diameter of the disc magnet in the associated planar-conical magnetic mount disc 102. The ferromagnetic member 204 is offset within the ferromagnetic disc body 202 in that the ferromagnetic member 204 is closer to the surface of the ferromagnetic disc body 202 intended to be brought into magnetic engagement with the planar-conical magnetic mount disc 102 than it is to the opposite surface of the ferromagnetic disc body 202 (i.e., the surface of the ferromagnetic disc body 202 intended to be closest to the user's body).

Usefully, the ferromagnetic disc mount 200 reduces extraneous magnetism and enhances desired magnetism. When a magnet is placed against a ferromagnetic material of adequate size and mass much of the magnetism is absorbed in the process. Additionally some of the magnetism is redirected back towards the magnet.

One or more planar-conical magnetic mount discs 102 may be used to temporarily mount a wearable unit 104 (or any device with a ferromagnetic mass of sufficient size and surface proximity) to a ferromagnetic surface (e.g., a vehicle body). As well, a planar-conical magnetic mount discs 102 (optionally in conjunction with a ferromagnetic disc mount 200) may be used to temporarily support a wearable unit 104 (or any device with a ferromagnetic mass of sufficient size and surface proximity) on a surface suitable in terms of angle from horizontal and frictional qualities. Analagous to use in attachment to clothing, when supporting a device on an underlying surface, the planar-conical magnetic mount discs 102 are preferably oriented with their planar sides 120 closer to the underlying surface as the planar side 120 of the lowermost planar-conical magnetic mount disc 102 provides a wider "base".

The possible wearable units 104 include numerous different devices, including: directional devices, being devices for which directional orientation is a relevant operational condition, for example, a light, a camera, a directional microphone, a directional emitter (e.g., a laser signature emitting component of a security system) etc.; and/or devices for which ready demountability (e.g., for hand use) and remountability are desirable features, for example, a light, a communication device, a sensor (e.g., an environmental monitor configured for both general monitoring and localized source detection), a locator utilizing both directional and proximity detectors (e.g., for locating a specific RFD tag) etc.

Figures 14, 15, 16:
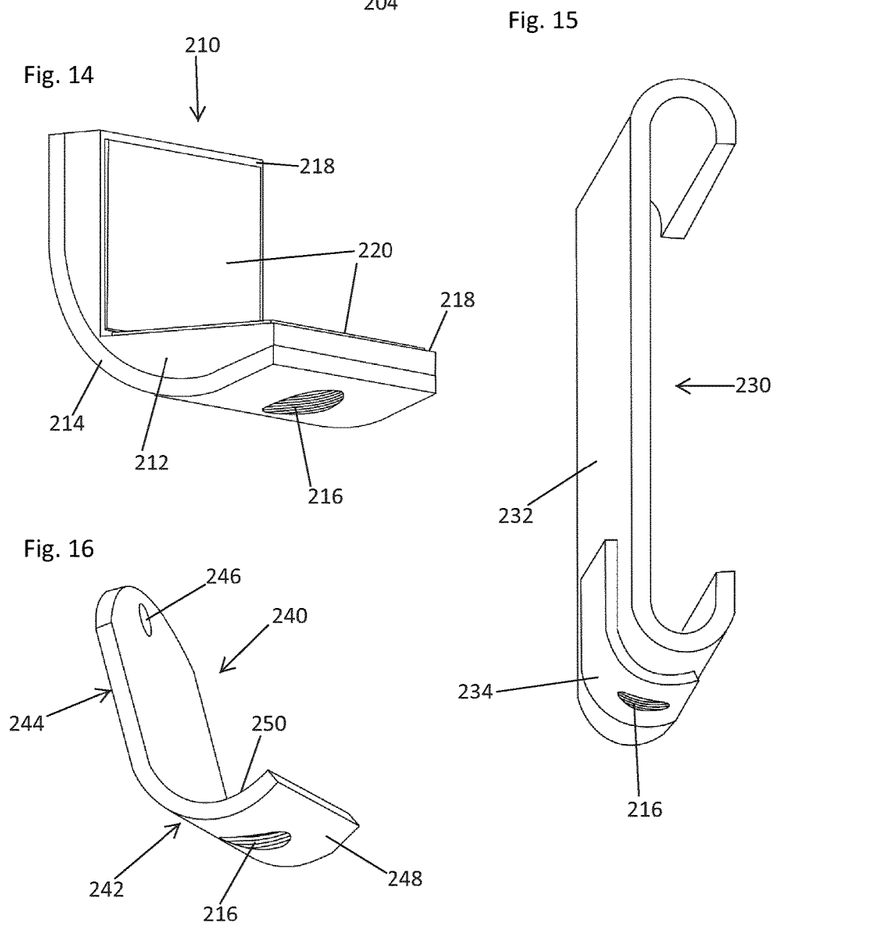
FIG. 14 is a perspective view of a right-angle adaptor embodiment.
FIG. 15 is a perspective view of a smart-phone adaptor embodiment.
FIG. 16 is a perspective view of a smart-phone-cradle mount embodiment.

Wearable units 104 may include adaptors for attaching the arcuate connector 148 to the relevant device. An example of an adaptor for attaching the arcuate connector 148 to a device, is the right-angle adaptor 210, having an adaptor body 212 affixed to a right-angle arcuate connector 214 (having a camera-mount bore 216, being a threaded bore sized for receiving a standard camera-mount threaded shaft) and the adaptor body 212 defining two mount surfaces 218 (oriented at 90 degrees to each other) with each mount surface 218 having an overlying adhesive material 220 (e.g., a high-bond peel and stick adhesive). A device with a surface suitable for attaching to at least one, and preferably both, of the mount surfaces 218 with the adhesive material 220, may be so attached and thereby used with the planar-conical magnetic mount disc 102 as described above or used with a conventional camera mount.

Another example of an adaptor for attaching the arcuate connector 148 to a device, is the smart-phone adaptor 230, having a smart-phone holder 232 affixed to a smart-phone arcuate connector 234 (having a camera-mount bore 216). In the drawings, the smart-phone holder 232 is shown in a simplified manner; apparatuses for securely holding smart phones are well known (e.g. selfie sticks), including adjustable apparatuses for holding smart phones of different sizes and shapes. A smart phone secured in the smart-phone holder 232 may be used with the planar-conical magnetic mount disc 102 as described above (including using the planar-conical magnetic mount disc 102 to temporarily position a smart phone for hands-free use, viewing video etc., for example on a ferromagnetic surface or a surface suitable in terms of angle from horizontal and frictional qualities) or used with a conventional camera mount.

Embodiments may also include a smart-phone-cradle mount 240 made from a ferromagnetic material and having a curved bottom 242 (with a camera-mount bore 216) and a back support 244 (having a tether opening 246 suitable for receiving a key chain or key ring). The convex side of the curved bottom 242 provides a smart-phone-cradle arcuate connector 248 and the concave side of the curved bottom 242 provides a phone-edge cradle 250 for supporting the edge of a smart phone. The smart-phone-cradle mount 240 is not configured for securely holding a smart phone but rather is configured for supporting a smart phone within a range of possible desirable angles (e.g., for hands-free use, viewing video etc.)

It will be clear that any suitable ferromagnetic body (including non-arcuate bodies) may be affixed to a device (e.g., with a high-bond adhesive strip, glue etc.) to enable use of the device with the planar-conical magnetic mount discs 102.

The scope of the claims should not be limited by the preferred embodiments set forth in the examples, but should be given the broadest interpretation consistent with the description as a whole.

What is claimed is:

1. A mount assembly for use in mounting a device to a user's article of clothing having a first side and a second side, the assembly comprising:
    a non-magnetized ferromagnetic connector associated with the device, wherein the connector is integral to the device, or affixed to the device, or configured for attachment to the device;
    a ferromagnetic member; and
    a magnetic mount disc comprising
        a first magnet having a pull force of about 10 pounds or greater, and a center of magnetic effect; and
        a magnetic mount body housing the first magnet, wherein:
            the magnetic mount body has an outer periphery:
            a distance from the center of magnetic effect to a portion of the outer periphery that is furthest from the center of magnetic effect is in the range of about 1 inch to about 3 inches; and
            the magnetic mount body is resiliently flexible;
    wherein:
        the magnetic mount disc is releasably securable at a desired location on the first side by positioning the ferromagnetic member on the second side so as to bring the first magnet and the ferromagnetic member into magnetic engagement;
        the connector is releasably securable to the magnetic mount disc by bringing the connector into magnetic engagement with the first magnet;
        the magnetic engagement between the first magnet and the ferromagnetic member may be broken by manual flexing of the outer periphery away from the ferromagnetic member; and
        the connector is a curved connector substantially defining a ruled surface, being a surface in which for every notional point on the surface there is a notional straight line that lies on the surface, wherein in the ruled surface: the notional straight lines are all substantially parallel to each other; and the ruled surface comprises a curve.

2. The mount assembly of claim 1, wherein the curved connector is a plate of substantially uniform thickness, wherein the curve comprises a cylindrical section with a constant radius and two opposed arc ends.

3. The mount assembly of claim 2, wherein the curve further comprises: a planar extension at one of the arc ends; or a first planar extension at one of the arc ends and a second planar extension at the other of the arc ends.

4. The mount assembly of claim 1, wherein the curve has an arc in the range of about 90 degrees to about 140 degrees.

5. The mount assembly of claim 4, wherein the arc is about 110 degrees.

6. The mount assembly of claim 1, wherein the curved connector comprises two spaced-apart bands.

7. The mount assembly of claim 1, wherein:
    the first magnet is a cylindrical rare-earth magnet with a magnet diameter;
    the curved connector has a curved connector length, being a dimension measured parallel to the notional lines; and
    a ratio of the magnet diameter to the curved connector length is in the range of 3:8 to 1:1.

8. The mount assembly of claim 7, wherein the ratio is 5:8.

9. The mount assembly of claim 1, wherein:
    the first magnet is a cylindrical rare-earth magnet;
    the first magnet is encapsulated within the magnetic mount body;
    a substantially uniform thickness of the magnetic mount body overlies each pole of the rare-earth magnet; and
    a pull force of the magnetic mount disc, being a pull force at the substantially uniform thickness of the magnetic mount body overlying one of the poles of the rare-earth magnet, is about 7 pounds or greater.

10. The mount assembly of claim 1, wherein the outer periphery is circular.

11. The mount assembly of claim 1, wherein the magnetic mount body comprises one or more of: a thermoplastic elastomer, a rubber and a silicone.

12. The mount assembly of claim 1, wherein the magnetic mount body has:
    a planar side;
    a disc edge about the outer periphery; and
    a truncated-cone side comprising:
        a central frustum substantially parallel to the planar side; and
        a conical annular section between the central frustum and the disc edge.

13. The mount assembly of claim 12, further comprising one or more disc holes extending between the planar side and the truncated-cone side.

14. The mount assembly of claim 1, wherein:
    the first magnet is a cylindrical rare-earth magnet with a diameter of about 0.625 inches and thickness of 0.25 inches; and
    the curved connector is a curved plate with a thickness of about 0.0625 inches and substantially defining a section of a cylinder wall of a right circular cylinder having:
        a radius of about 0.5 inches;
        an arc of about 110 degrees; and
        a length, being the length of the plate measured parallel to a right circular cylinder axis, of about 1 inch.

15. The mount assembly of claim 1,
    wherein the ferromagnetic member is a second magnet having a pull force of about 10 pounds or greater, and a second center of magnetic effect; and
    further comprising a ferromagnetic mount body housing the second magnet, wherein:
        the ferromagnetic mount body has a ferromagnetic mount body outer periphery;

a distance from the second center of magnetic effect to a portion of the ferromagnetic mount body outer periphery that is furthest from the second center of magnetic effect is in the range of about 1 inch to about 3 inches; and the ferromagnetic mount body is resiliently flexible.

16. The mount assembly of claim 15, wherein each of the first magnet and second magnet is a cylindrical rare-earth magnet.

17. The mount assembly of claim 15, wherein one or both of the first magnet and second magnet is:

a cylindrical rare-earth magnet with an annular ridge; or a cylindrical rare-earth magnet with an annular groove; or two cylindrical rare-earth magnets and a ferromagnetic wafer, wherein the rare-earth magnets have a diameter, the wafer has a cross dimension greater than the diameter, and the wafer is interposed between, and in magnetic engagement with, the rare-earth magnets whereby a portion of the wafer projects from between the rare-earth magnets; or a ring rare-earth magnet; or a polygonal rare-earth magnet.

\* \* \* \* \*